United States Patent
Yamada et al.

(10) Patent No.: US 11,680,628 B2
(45) Date of Patent: Jun. 20, 2023

(54) BALL SCREW DEVICE

(71) Applicant: NSK LTD., Tokyo (JP)

(72) Inventors: Kazuya Yamada, Kanagawa (JP); Yuji Shimomura, Kanagawa (JP); Kanta Sato, Kanagawa (JP); Yasuaki Abe, Kanagawa (JP)

(73) Assignee: NSK LTD., Tokyo (KR)

( * ) Notice: Subject to any disclaimer, the term of this patent is extended or adjusted under 35 U.S.C. 154(b) by 123 days.

(21) Appl. No.: 17/439,254

(22) PCT Filed: Mar. 10, 2021

(86) PCT No.: PCT/JP2021/009489
§ 371 (c)(1),
(2) Date: Sep. 14, 2021

(87) PCT Pub. No.: WO2021/199989
PCT Pub. Date: Oct. 7, 2021

(65) Prior Publication Data
US 2023/0087898 A1 Mar. 23, 2023

(30) Foreign Application Priority Data
Apr. 2, 2020 (JP) .............................. JP2020-066567

(51) Int. Cl.
*F16H 25/22* (2006.01)
(52) U.S. Cl.
CPC ................................ *F16H 25/2214* (2013.01)
(58) Field of Classification Search
CPC ............. F16H 25/2214; F16H 25/2219; F16H 25/2228; F16H 25/22; F16H 2025/2271; F16H 2025/228; F16H 25/2238
See application file for complete search history.

(56) References Cited

U.S. PATENT DOCUMENTS

| 2002/0023513 A1* | 2/2002 | Sekiya | F16H 25/2214 74/424.86 |
| 2002/0073794 A1* | 6/2002 | Ohkubo | F16H 25/2214 74/424.86 |

(Continued)

FOREIGN PATENT DOCUMENTS

| JP | 2002-181155 A | 6/2002 |
| JP | 2017-078439 A | 4/2017 |
| WO | 2010/013706 A1 | 2/2010 |

OTHER PUBLICATIONS

International Search Report for PCT/JP2021/009489 dated Apr. 6, 2021.
Written Opinion for PCT/JP2021/009489 dated Apr. 6, 2021.

*Primary Examiner* — Zakaria Elahmadi
(74) *Attorney, Agent, or Firm* — Sughrue Mion, PLLC

(57) ABSTRACT

In the ball screw device, the circulation path that returns balls from the end point to the start point of the load path includes a return path, scooping paths, and connecting paths. The scooping path has an arc-shaped center line that is curved outward in the radial direction as going toward the reference imaginary flat plane including the center axis of the screw shaft and the center line of the return path in the circumferential direction. The connecting path is arranged on the reference imaginary flat plane and includes a straight path having a linear center line extending in a direction orthogonal to the center axis of the screw shaft. When the radius of curvature of the center line of the scooping path is R1, the scooping angle is θ, and the entire length of the straight path is S, $R1\cos(90°-\theta)+S$ is made larger than the diameter of the balls.

7 Claims, 21 Drawing Sheets

(56) References Cited

U.S. PATENT DOCUMENTS

| | | | | |
|---|---|---|---|---|
| 2003/0196504 A1* | 10/2003 | Watanabe | ............ | F16H 25/2214 74/424.82 |
| 2005/0183530 A1* | 8/2005 | Kato | ................... | F16H 25/2219 74/424.87 |
| 2007/0221003 A1* | 9/2007 | Chen | ................... | F16H 25/2214 74/424.86 |
| 2010/0170359 A1* | 7/2010 | Chen | ................... | F16H 25/2214 74/424.86 |
| 2011/0303036 A1* | 12/2011 | Chen | ................... | F16H 25/2214 74/424.83 |
| 2013/0239725 A1* | 9/2013 | Miyazaki | ............ | F16H 25/2214 74/424.86 |
| 2013/0298710 A1* | 11/2013 | Kreutzer | ............ | F16H 25/2214 74/424.86 |
| 2014/0224052 A1* | 8/2014 | Chen | ................... | F16H 25/2214 74/424.86 |
| 2018/0100566 A1* | 4/2018 | Yamazaki | ............ | F16H 25/2219 |

* cited by examiner

BALL SCREW DEVICE

CROSS REFERENCE TO RELATED APPLICATIONS

This application is a National Stage of International Application No. PCT/JP2021/009489 filed Mar. 10, 2021, claiming priority based on Japanese Patent Application No. 2020-066567 filed Apr. 2, 2020.

TECHNICAL FIELD

The present invention relates to a ball screw device.

BACKGROUND ART

Since a ball screw device rolls and moves balls between a screw shaft and a nut, the ball screw device has higher efficiency as compared with a sliding screw device in which a screw shaft and a nut are in direct contact. Therefore, the ball screw device is incorporated into various mechanical devices such as electric braking devices for automobiles, automatic manual transmissions (AMT), and positioning devices for machine tools, in order to convert a rotational motion of a drive source such as an electric motor into a linear motion.

A ball screw device includes a screw shaft having a spiral shaft-side ball screw groove on the outer-circumferential surface, a nut having a spiral nut-side ball screw groove on the inner-circumferential surface, a plurality of balls that roll on a load path (load ball rolling path) composed of the shaft-side ball screw groove and the nut-side ball screw groove, and a circulation component which returns the balls from the end point to the start point of the load path. The circulation component has a circulation path (no-load ball rolling path) which connects the stat point and the end point of the load path inside.

Ball screw devices are classified into such as return tube (pipe) type, deflector type, end cap type, and spinning top type depending on the difference in its ball circulation system. However, regardless of the type of the circulation system, the circulation path for circulating the balls gives a great influence on various performances of a ball screw device such as smooth circulation of the balls. Accordingly, devising a route of a circulation path has been conventionally practiced.

For example, WO2010/013706 discloses an invention in which the number of turns of the load path is made close to an integer and the route of the circulation path is devised in order to achieve smooth circulation of the balls. FIGS. 16 to 20 illustrate a ball screw device 100 of a conventional structure which is described in WO2010/013706.

The ball screw device 100 includes a screw shaft 101, a nut 102, a plurality of balls 103, and circulation component 104. Here, in this specification, the axial direction, the radial direction, and the circumferential direction mean, unless specified otherwise, the axial direction, the radial direction, and the circumferential direction in relation to the screw shaft. Furthermore, the center side of the nut in the axial direction is referred to as the inside in the axial direction, and the both sides of the nut are referred to as the outside in the axial direction.

The screw shaft 101 has a spiral shaft-side ball screw groove 105 on the outer-circumferential surface. The nut 102 has a spiral nut-side ball screw groove 106 on the inner-circumferential surface. The screw shaft 101 is inserted inside the nut 102 and is arranged coaxially with the nut 102. The shaft-side ball screw groove 105 and the nut-side ball screw groove 106 are arranged so as to face each other in the radial direction, and form a spiral load path 107.

The circulation component 104 is attached to the outer-circumferential surface of the nut 102. The start point P1 and the end point P2 of the load path 107 are connected by the circulation path 108 provided inside the circulation component 104. FIG. 18 illustrates the center lines (centroid of the balls 103) of the load path 107 and the circulation path 108. The balls 103 that have reached the end point P2 of the load path 107 are returned to the start point P1 of the load path 107 through the circulation path 108. Here, the start point and the end point of the load path 107 are interchanged depending on the direction of relative displacement (direction of relative rotation) in the axial direction of the screw shaft 101 and the nut 102. That is, when the nut 102 displaces to the right side in FIG. 17 with respect to the screw shaft 101, P1 becomes the start point and P2 becomes the end point. On the other hand, when the nut 102 displaces to the left side in FIG. 17 with respect to the screw shaft 101, P2 becomes a start point and P1 becomes the end point. The number of the circulation component 104 is an arbitrary number of one or more, and is two in the illustrated example.

The circulation path 108 is divided into a plurality of routes (sections) according to the roles. In the ball screw device 100 of a conventional structure, the circulation path 108 may be divided into a return path 109, scooping paths 110, and connecting paths 111.

The return path 109 has a role of returning the balls 103 from the end point side to the start point side of the load path 107 in the axial direction. The return path 109 is arranged on the outside in the radial direction of the load path 107, and has a center line parallel to the center axis $O_{101}$ of the screw shaft 101.

The scooping paths 110 have a role of scooping up the balls 103 from the load path 107. As illustrated in FIG. 19, the center line of the scooping paths 110 is curved when viewed from the axial direction, and is extending from the center line of the load path 107 to the reference imaginary flat plane α including the center axis $O_{101}$ of the screw shaft 101 and the center line of the return path 109. In the ball screw device 100 of a conventional structure, each of the scooping paths 110 is composed of an inner-diameter-side scooping path 110a arranged in the inside portion in the radial direction and an outer-diameter-side scooping path 110b arranged in the outside portion in the radial direction.

As illustrated in FIG. 20, the center line of the inner-diameter-side scooping path 110a is arranged parallel to the orthogonal imaginary flat plane orthogonal to the center axis $O_{101}$ of the screw shaft 101 when viewed from the direction orthogonal to the reference imaginary flat plane α (side of the nut 102).

On the other hand, the center line of an outer-diameter-side scooping path 110b is not only curved in an arc shape when viewed from the axial direction, but also curved in an arc shape when viewed from the direction orthogonal to the reference imaginary flat plane α. That is, the center line of the outer-diameter-side scooping path 110b is curved in a direction toward the outside in the radial direction as approaching the reference imaginary flat plane α in the circumferential direction, and is also curved in a direction toward the inside in the axial direction.

The connecting paths 111 have a role of connecting the scooping paths 110 (outer-diameter-side scooping paths 110b) and the return path 109 and changing the moving direction of the balls 103. The center line of the connecting path 111 is arranged on the reference imaginary flat plane α, and is curved in a direction (approaching the return path 109) inward in the axial direction as going toward the outside in the radial direction. Therefore, the connecting path 111 is also curved in an arc shape when viewed from the direction orthogonal to the reference imaginary flat plane α, similarly to the outer-diameter-side scooping paths 110b.

CITATION LIST

Patent Literature

Patent Literature 1: WO2010/013706

SUMMARY OF INVENTION

Technical Problem

The required performance and size (physical constitution) of a ball screw device differ depending on applications. In a ball screw device for automobiles incorporated in an electric brake booster device or the like, from the view point of improving the fuel efficiency and running performance of an automobile, it is especially important to: (1) be small, (2) obtain a large generated thrust with a small drive torque, and (3) have a large load capacity.

For this reason, in a ball screw device for automobiles, the number of the threads of a thread groove is set to one, and the lead of the thread groove is set to be smaller than the diameter of balls. More specifically, the ratio of the lead of the thread groove with respect to the diameter of the balls is set to 0.6 or more. Furthermore, in order to increase the number of balls that may be accommodated in the load path, it is also considered to set a large scooping angle.

However, when the number of the threads of the shaft-side ball screw groove 105 and the nut-side ball screw groove 106 is respectively set to one and the ratio of the lead with respect to the diameter of the balls 103 is set to 0.6 or more and the scooping angle is set to large in order to apply the ball screw device 100 of a conventional structure having the circulation path 108 as described above to automotive applications, part of the circulation path 108 may interfere with the load path 107. More specifically, as illustrated in FIG. 21, the outer-diameter-side scooping paths 110b or the connecting paths 111 of the circulation path 108 may cross the groove portion of the second row from the outside in the axial direction (portion G in FIG. 21) of the nut-side ball screw groove 106. Due to this, it is difficult to use the ball screw device 100 of a conventional structure as a ball screw device for an automobile.

The present invention has been made to solve the above problems, and the objective of the present invention is to provide a ball screw device suitable for automotive applications.

Solution to Problem

The ball screw device of one aspect of the present invention includes a screw shaft, a nut, a load path, a circulation path, and a plurality of balls.

The screw shaft has a spiral shaft-side ball screw groove having the number of threads of one on the outer-circumferential surface.

The nut has a spiral nut-side ball screw groove having the number of threads of one on the inner-circumferential surface.

The load path is spiral and is composed of the shaft-side ball screw groove and the nut-side ball screw groove.

The circulation path connects the start point and the end point of the load path.

The plurality of balls rolls on the load path and the circulation path.

In the ball screw device of one aspect of the present invention, the circulation path has:

a return path that is arranged on the outside in the radial direction of the load path and has a center line parallel to the center axis of the screw shaft, scooping paths that are respectively arranged on both sides in the length direction of the return path and scoop up the balls from the load path, and connecting paths that are respectively arranged on both sides in the length direction of the return path and connect the return path and the scooping paths.

The scooping paths respectively have an arc-shaped center line that curves in a direction toward outside in the radial direction as approaching the reference imaginary flat plane including the center axis of the screw shaft and the center line of the return path with respect to the circumferential direction and extends from the center line of the load path to the reference imaginary flat plane.

The connecting paths respectively have a straight path having a linear center line that is arranged on the reference imaginary flat plane and extends in a direction orthogonal to the center axis of the screw shaft, and an arc path having an arc-shaped center line that is arranged on the reference imaginary flat plane and is curved inward in the axial direction and as going toward outside in the radial direction (approaching the return path).

When the lead of the shaft-side ball screw groove and the nut-side ball screw groove (the thread groove of the load path) is L, the diameter of the balls is D, the radius of curvature of the center lines of the scooping paths is R1, the scooping angle of the balls by each of the scooping paths is θ, and the entire length of the straight path is S, $D/L \geq 0.6$ and $R1 \cos(90°-θ)+S>D$ are satisfied.

In the ball screw device of one aspect of the present invention, both of the radius of curvature of the cross-sectional shape of an outer diameter side portion of the inner wall surface of each of the scooping paths, which is located on the side far from the center of curvature of each of the scooping paths, and the radius of curvature of the cross-sectional shape of an outer diameter side portion of the inner wall surface of the arc path, which is located on the side far from the center of curvature of the arc path, may be larger than half of the diameter of the balls.

In the ball screw device of one aspect of the present invention, the tangent line with respect to the center line of the load path and the tangent line with respect to the center line of each of the scooping paths may be aligned with each other when viewed from the axial direction at the connecting point between the center line of the load path and the center line of each of the scooping paths.

In the ball screw device of one aspect of the present invention, the tangent line with respect to the center line of each of the scooping paths at the connecting point between the center line of each of the scooping paths and the center line of the straight path may be arranged on the reference imaginary flat plane.

In the ball screw device of one aspect of the present invention, the center line of each of the scooping paths may be inclined by an angle corresponding to the lead angle of the shaft-side ball screw groove when viewed from the direction orthogonal to the reference imaginary flat plane.

The ball screw device of one aspect of the present invention may further include a circulation component having part or all of the circulation path inside thereof.

In this case, the circulation path may be formed by the circulation component and the nut.

Advantageous Effect of Invention

In the ball screw device of one aspect of the present invention, a route of a circulation path suitable for automotive applications is provided.

DESCRIPTION OF EMBODIMENTS

Figure 1:
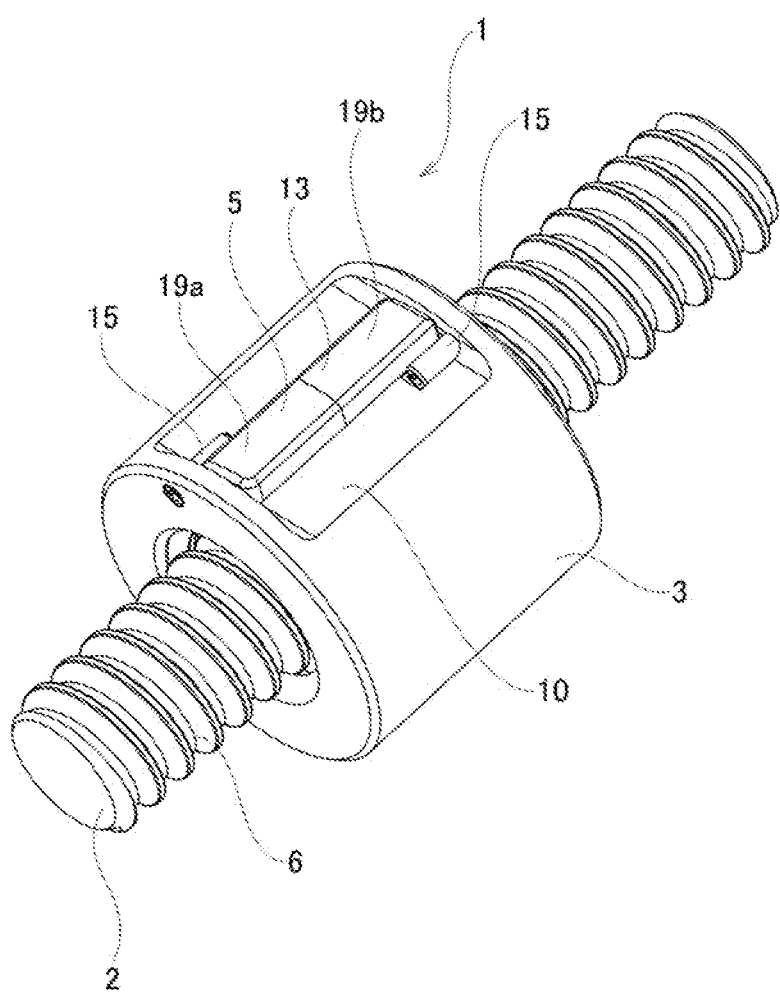
FIG. 1 is a perspective view of a ball screw device of an example of an embodiment of the present invention.
Figure 2:
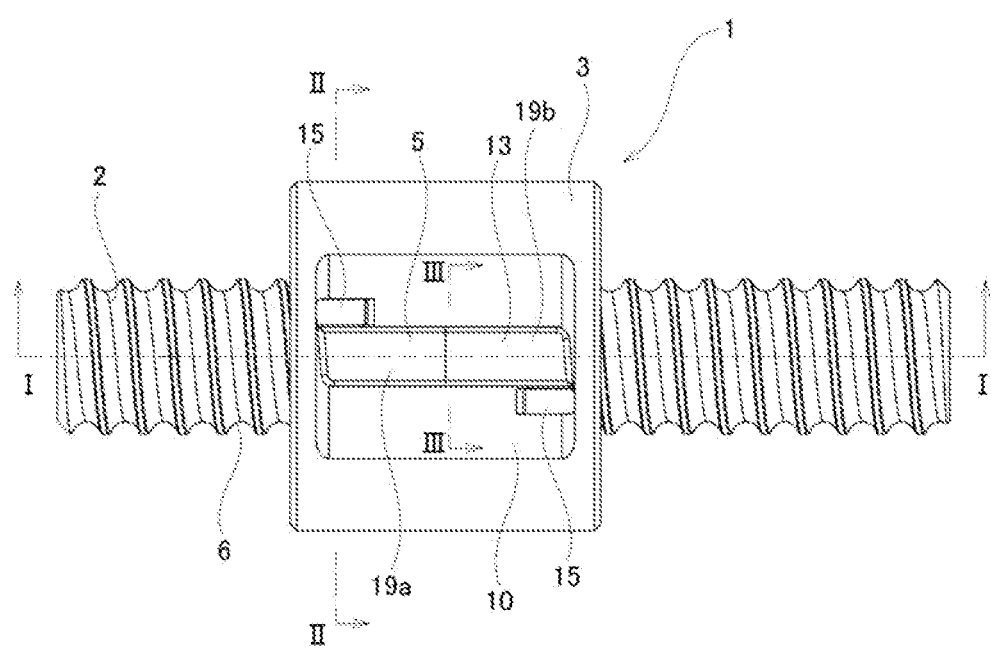
FIG. 2 is a plan view of the ball screw device.
Figure 3:
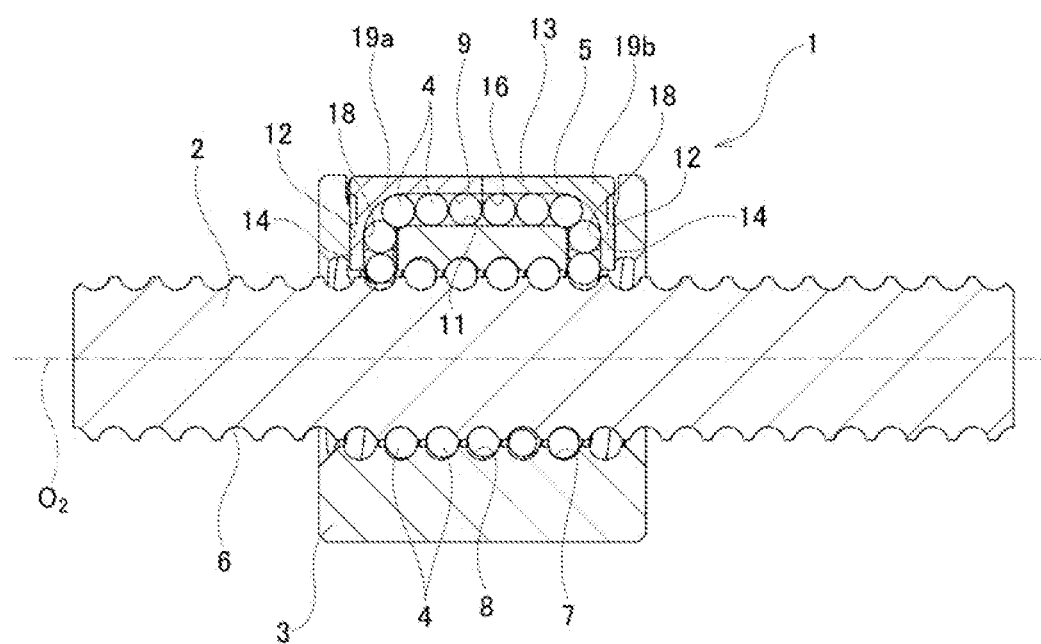
FIG. 3 is a cross-sectional view of section I-I in FIG. 2.
Figure 4:
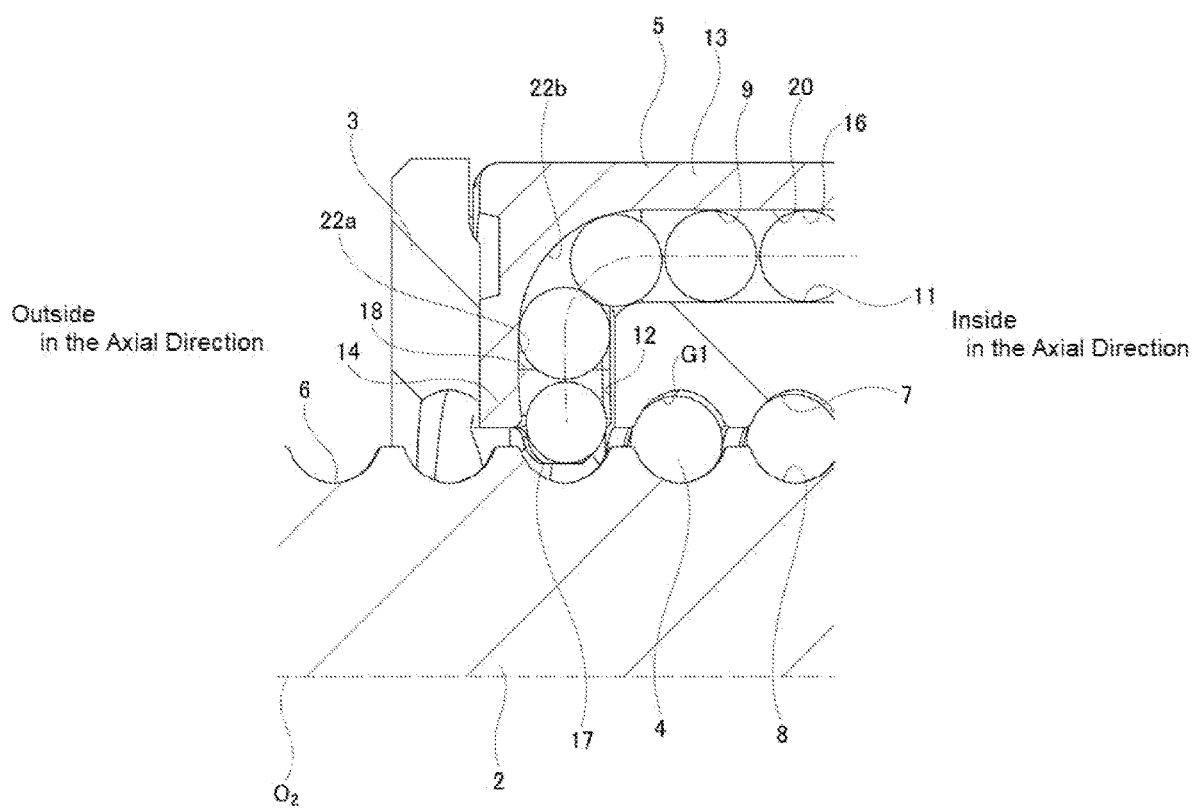
FIG. 4 is a partially enlarged view of FIG. 3.
Figure 5:
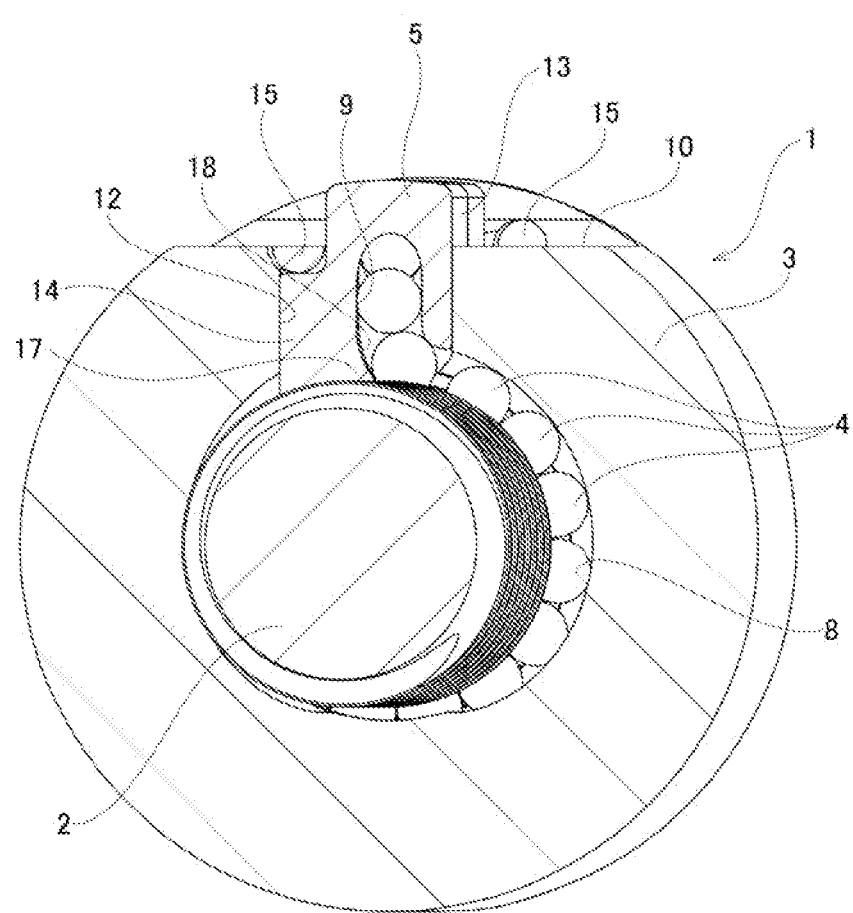
FIG. 5 is a perspective view of section II-II in FIG. 2.
Figure 6:
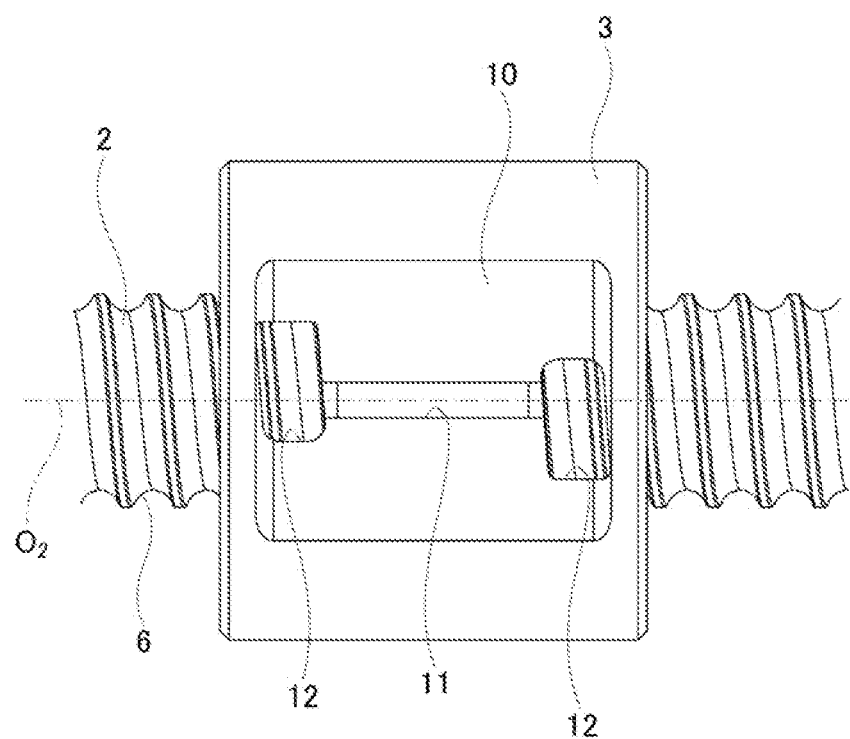
FIG. 6 is a plan view of the ball screw device with a circulation component omitted.
Figure 7:
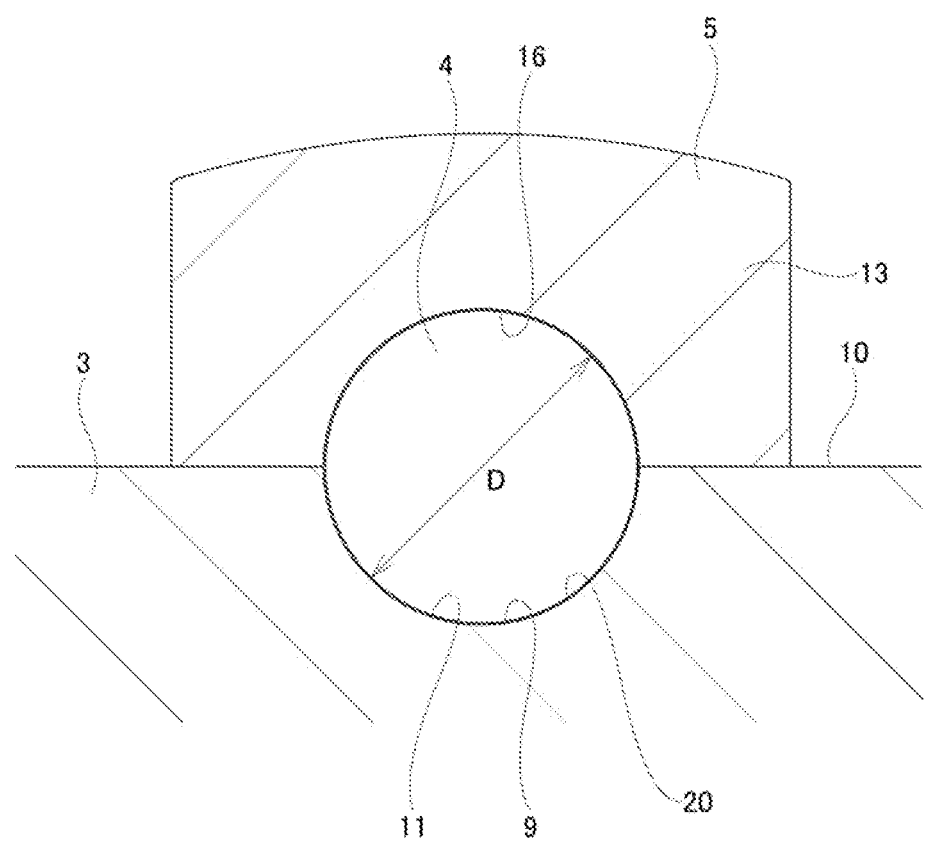
FIG. 7 is a cross-sectional view of section III-III in FIG. 2.
Figure 8:
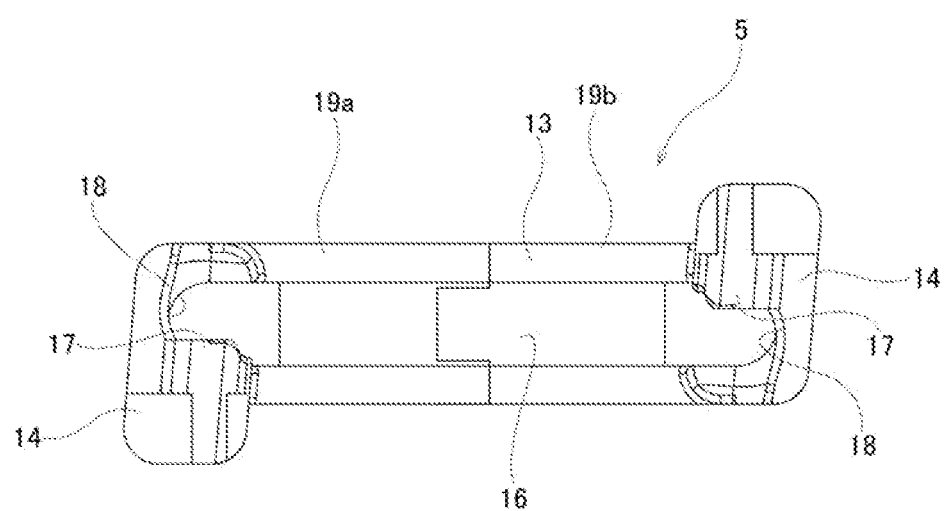
FIG. 8 is a bottom view of the circulation component of the ball screw device as viewed from the inside in the radial direction.

An example of an embodiment of the present invention will be described with reference to FIGS. 1 to 15.

[Overall Structure of Ball Screw Device]

The ball screw device 1 of the present example is suitable for use with automotive applications. As a nonlimiting example, the ball screw device 1 is incorporated into an electric brake booster device in order to convert the rotational motion of an electric motor which is a drive source into a linear motion so as to operate a piston of a hydraulic cylinder.

The ball screw device 1 of this example includes a screw shaft 2, a nut 3, and a plurality of balls 4 as components. Further, the ball screw device 1 of this example includes a circulation component 5.

The screw shaft 2 is inserted inside the nut 3 and is arranged coaxially with the nut 3. A spiral load path 8 of the ball screw device 1 of this example is provided between the outer-circumferential surface of the screw shaft 2 and the inner-circumferential surface of the nut 3. A circulation path 9 of the ball screw device 1 of this example is provided between the outer-circumferential surface of the nut 3 and the circulation component 5. The circulation path 9 is connected to the start point and the end point of the load path 8. The plurality of balls 4 are arranged in the load path 8 and the circulation path 9 so as to be able to roll. When the screw shaft 2 and the nut 3 are relatively rotated, the balls 4 that have reached the end point of the load path 8 are returned to the start point of the load path 8 through the circulation path 9. The ball screw device 1 may convert a linear motion into a rotational motion or a rotational motion into a linear motion. More specifically, for example, the ball screw device 1 is used in a manner in which the screw shaft 2 is linearly moved with respect to the nut 3 by rotating the nut 3 relative to the screw shaft 2. The structures of the components and elements of the ball screw device 1 will be described below, and then the path of the circulation path 9 will be described in detail.

[Screw Shaft]

The screw shaft 2 is made of metal and has a spiral shaft-side ball screw groove 6 having a constant lead L on the outer-circumferential surface. The shaft-side ball screw groove 6 is formed by performing a grinding process, a cutting process, or a rolling process to the outer-circumferential surface of the screw shaft 2. The number of threads of the shaft-side ball screw groove 6 is one. The groove shape (groove bottom shape) of the cross section of the shaft-side ball screw groove 6 is a Gothic arch groove or a circular arc groove.

[Nut]

The nut 3 is made of metal and has a substantially cylindrical shape as a whole. The nut 3 has a spiral nut-side ball screw groove 7 on the inner-circumferential surface. The nut-side ball screw groove 7 is formed by performing a grinding process, a cutting process, or a rolling process to the inner-circumferential surface of the nut 3. The nut-side ball screw groove 7 has the same lead L as the shaft-side ball screw groove 6. The number of threads of the nut-side ball screw groove 7 is one as in the case of the shaft-side ball screw groove 6. The groove shape of the cross section of the nut-side ball screw groove 7 is also a Gothic arch groove or a circular arc groove as in the case of the shaft-side ball screw groove 6.

When the screw shaft 2 is inserted and arranged inside the nut 3, the shaft-side ball screw groove 6 and the nut-side ball screw groove 7 are arranged so as to face each other in the radial direction, and form a spiral load path 8.

The nut 3 has a flat surface-shaped seating surface portion 10 at one location in the circumferential direction of the outer-circumferential surface. The seating surface portion 10 is provided with a nut-side concave groove 11 and through holes 12 arranged on both sides in the axial direction of the nut-side concave groove 11. A circulation component 5 is attached to the seating surface portion 10.

The nut-side concave groove 11 extends linearly in the axial direction and is arranged so as to be parallel to the $O_2$ of the screw shaft 2. The groove shape of the cross section of the nut-side concave groove 11 is an arc shape having a diameter which is larger than half of the diameter D of the balls 4. The depth dimension of the nut-side concave groove 11 from the seating surface portion 10 does not change in the axial direction at the intermediate portion, however, it becomes curvilinearly larger toward the through holes 12 at the end portions on both sides in the axial direction.

Each of the through holes 12 is formed so as to penetrates the nut 3 in the radial direction, and is open to the seating surface portion 10 and the inner-circumferential surface of the nut 3. More specifically, each of the through holes 12 is open to the nut-side ball screw groove 7 of the inner-circumferential surface of the nut 3. Furthermore, each of the through holes 12 is an elongated hole (rectangular hole) extending along the nut-side ball screw groove 7. The ends on both sides in the length direction of the circulation component 5 (leg portions 14 as will be described later) are inserted into the through holes 12 respectively without any looseness. As a result, the circulation component 5 is positioned with respect to the nut 3.

[Balls]

The balls 4 are steel balls having a predetermined diameter D, and are arranged in the load path 8 and the circulation path 9 so as to be able to roll. The balls arranged in the load path 8 roll while receiving a compressive load, on the other hand, the balls arranged in the circulation path 9 are pushed by the subsequent balls 4 and roll without receiving a compressive load. Since the ball screw device 1 of this example is applied to automotive applications, the ratio (D/L) of lead L of the shaft-side ball screw groove 6 and the nut-side ball screw groove 7 with respect to the diameter D of the balls 4 is set to 0.6 or more (D/L≥0.6) so that a large generated thrust may be obtained with a small drive torque.

[Circulation Component]

The circulation component 5 is made of an injection-molded product of synthetic resin or metal powder, and includes a main body portion 13 and leg portions 14 that are respectively provided at end portions on both sides in the length direction of the main body portion 13. The circulation component 5 has a rotationally symmetric shape centered on the center section in the length direction. The circulation component 5 is fixed to the seating surface portion 10 of the nut 3 by using a holding member 15 so as not to fall off. The ball screw device 1 of this example employs a circulation system of a return tube type (external circulation type). In the illustrated example, a pin-shaped member is used as the holding member 15. However, a plate-shaped member may also be used as the holding member 15.

The main body portion 13 is formed in a long plate shape (substantially semi-cylindrical shape), and is arranged so as to cover the nut-side concave groove 11 provided in the seating surface portion 10 from the outside in the radial direction. A main-body-side concave groove 16 extending linearly in the axial direction is provided in the intermediate portion in the width direction of the inside surface in the radial direction of the main body portion 13 which is facing the nut-side concave groove 11. The groove shape of the cross section of the main-body-side concave groove 16 is an arc shape having a radius of curvature which is larger than half of the diameter D of the balls 4. The depth dimension of the main-body-side concave groove 16 from the inside surface in the radial direction of the main body portion 13 does not change in the axial direction at the intermediate portion, however, it becomes curvilinearly smaller toward outside in the axial direction at the end portions on both sides in the axial direction.

Of the inside surface in the radial direction of the main body portion 13, both side portions in the width direction deviating from the main-body-side concave groove 16 are seated on the seating surface portion 10. The outside surface in the radial direction of the main body portion 13 is formed into a partially cylindrical surface shape having a radius of curvature substantially the same as the radius of curvature of the outer-circumferential surface of the nut 3 so as not to protrude toward the outside in the radial direction from the outer-circumferential surface of the nut 3. In a case of implementing the present invention, although not illustrated, the outside surface in the radial direction of the main body portion may also have a flat surface portion in the center section in the width direction which is parallel to the seating surface portion 10 and a pair of tapered surfaces on both sides in the width direction of the flat surface portion that are inclined with respect to the seating surface portion 10.

Each of the leg portions 14 is formed into a substantially semi-cylindrical shape, and extends toward inside in the radial direction from the end portions on both sides in the length direction of the main body portion 13. The leg portions 14 are inserted inside the through holes 12 formed in the nut 3 from the outside in the radial direction without any looseness. Each of the tip end portions of the leg portions 14 (radially inward end portions) is provided with a tongue-piece-shaped scooping portion 17 for scooping the balls 4 rolling on the load path 8 and guiding them to the circulation path 9. The scooping portions 17 are arranged inside the shaft-side ball screw groove 6. The leg portions 14 are provided with leg-portion-side concave grooves 18 that are smoothly connected to the end portions in the axial direction of the main-body-side concave groove 16 provided in the main body portion 13. The leg-portion-side concave grooves 18 are open to the portions facing outside in the axial direction of the inner-circumferential surfaces of the through holes 12.

In this example, the circulation path 9 is formed in a portion between the circulation component 5 and the nut 3 with the circulation component 5 attached to the nut 3. That is, the circulation path 9 is not composed of only the circulation component 5, but is composed of the circulation component 5 and the nut 3. Therefore, the inner wall surface of the circulation path 9 is provided not only in the circulation component 5 but also in the nut 3. In this example, the circulation path 9 is formed by a space having a substantially circular cross section formed between the main-body-side concave groove 16 and the nut-side concave groove 11 and a space having a substantially circular cross section formed between the leg-portion-side concave grooves 18 and the inner-circumferential surfaces of the through holes 12. The circulation path 9 is connected to the start point and the end point of the load path 8, respectively. The start point and the end point of the load path 8 are, in other words, the connecting points (boundaries) between the load path 8 and the circulation path 9, and are points scooped by the scooping portions 17. The start point and the end point of the load path 8 are interchanged as the direction of relative displacement (direction of relative rotation) with respect to the axial direction of the screw shaft 2 and the nut 3 changes and the moving direction of the balls 4 changes.

In this example, the circulation component 5 is configured by connecting two pieces 19a, 19b in the axial direction. Each of the pieces 19a, 19b includes a half portion of the main body portion 13 and one leg portion 14. However, as in the modification illustrated in FIG. 15, a member that is integrally formed as a whole may also be used as the circulation component. Alternatively, the circulation component may be formed by connecting more than three pieces.

When, for example, an injection-molded product made from metal powder is used as the circulation component 5, the circulation component 5 may be manufactured by Metal powder Injection Molding method (MIM). In this case, for example, Fe—Ni—C (1-8% of Ni, up to 0.8% of C), Fe—Cr—C (0.5-2% of Cr, 0.4-0.8% of C), SCM415, or SUS630 may be used as the metal powder (alloy for MIM) for the circulation component 5.

[Explanation of Circulation Path]

Figure 9:
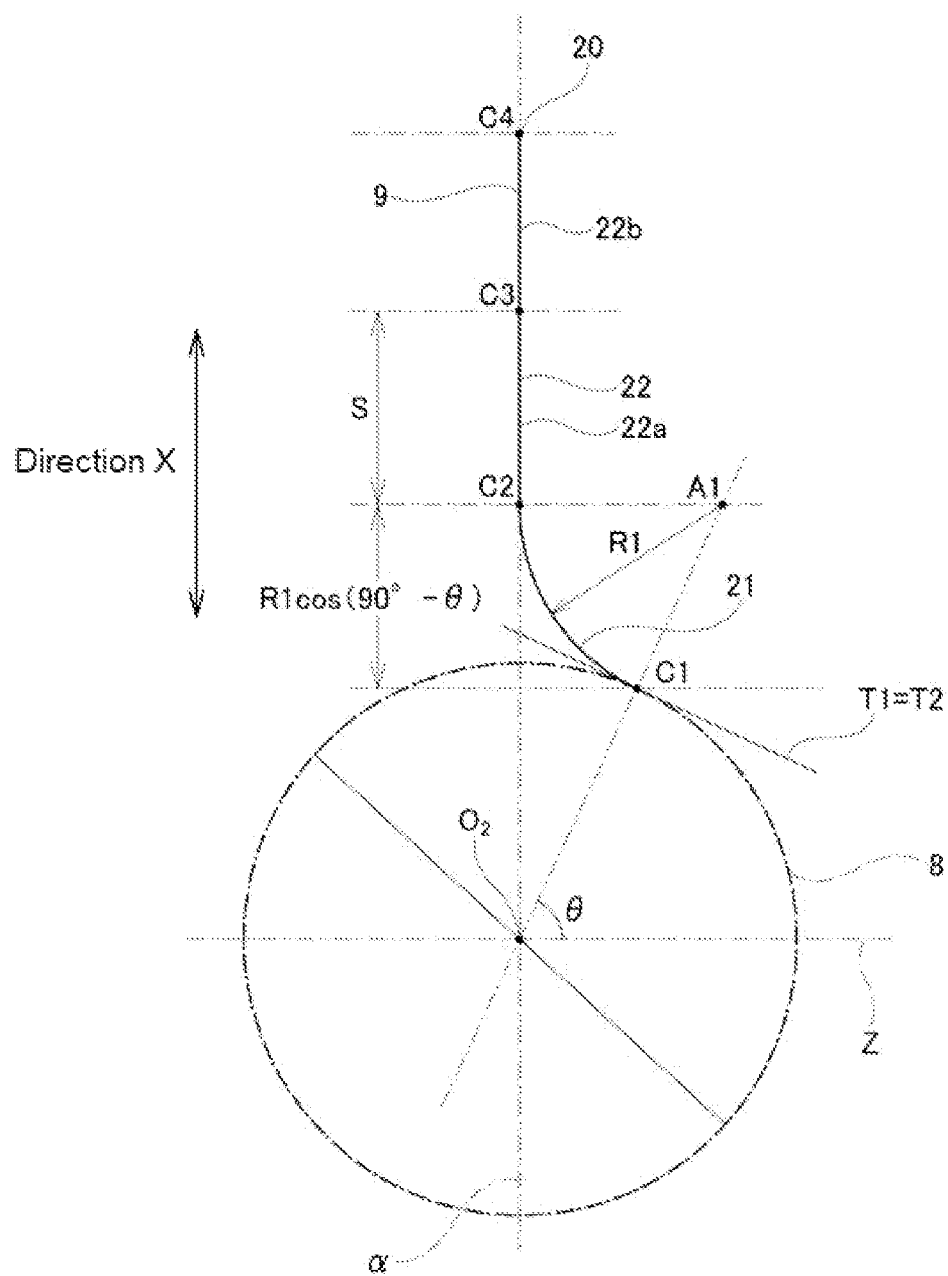
FIG. 9 schematically represents part of the center line of the circulation path of the ball screw device as viewed from the axial direction.
Figure 10:
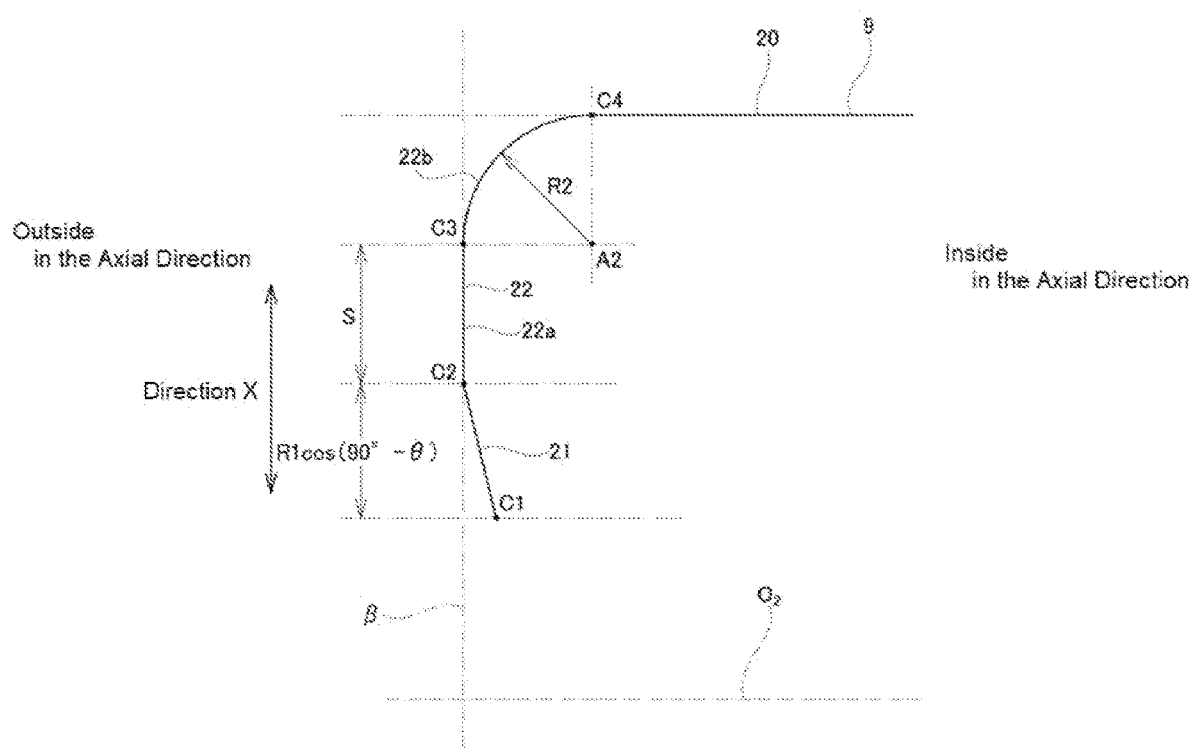
FIG. 10 schematically represents part of the center line of the circulation path of the ball screw device as viewed from the nut side.

The circulation path 9 has a route that can avoid interference with the load path 8, and includes a return path 20, scooping paths 21 that are arranged on both sides in the length direction of the return path 20 respectively, and connecting paths 22 that are arranged on both sides in the length direction of the return path 20 respectively and connect the return path 20 and the scooping paths 21. The route of the circulation path 9 of this example will be described in the following with reference to FIGS. 9 to 12. FIG. 9 illustrates part of the center line (centroid of the balls 4) of the circulation path 9 as viewed from the axial direction, and FIG. 10 illustrates part of the center line (half portion) of the circulation path 9 as viewed from the side of the nut 3 (direction orthogonal to the reference imaginary flat plane α as will be described later).

In the circulation path 9, from the end point to the start point of the load path 8, a scooping path 21, a connecting path 22, the return path 20, a connecting path 22, and a scooping path 21 are arranged in this order. Both sides in the length direction of each of the scooping paths 21 are connected to the load path 8 and one of the connecting paths 22. The both sides in the length direction of each of the connecting paths 22 are connected to one of the scooping paths 21 and the return path 20. Both sides in the length direction of the return path 20 are respectively connected to the connecting paths 22.

[Return Path]

The return path 20 has a role of returning the balls 4 from the end point side to the start point side of the load path 8 in the axial direction. The return path 20 is composed of an intermediate portion in the axial direction of the main-body-side concave groove 16 and an intermediate portion in the axial direction of the nut-side concave groove 11, and is arranged on the outside in the radial direction of the load path 8. The return path 20 has a center line parallel to the center axis $O_2$ of the screw shaft 2 extending linearly in the axial direction. Therefore, in this example, it is possible to bring the phases between the start point and the end point of the load path 8 closer and to bring the number of turns of the load path 8 closer to an integer.

In the following description, the imaginary flat plane including the center axis $O_2$ of the screw shaft 2 and the center line of the return path 20 is referred to as a reference imaginary flat plane α. The imaginary flat plane orthogonal to the center axis $O_2$ of the screw shaft 2 is referred to as an orthogonal imaginary flat plane β. Further, the direction orthogonal to the center axis $O_2$ of the screw shaft 2 and the center line of the return path 20 respectively is referred to as a direction X. Furthermore, the scooping paths 21 and the connecting paths 22 are respectively arranged on both sides in the length direction of the return path, but their respective shapes are the same on both sides except when arranged symmetrically around the center section in the length direction.

[Scooping Paths]

The scooping paths 21 have a role of scooping up the balls 4 at the end point of the load path 8 and supplying the balls 4 to the start point of the load path 8. Each of the scooping paths 21 is composed of a leg-portion-side concave groove 18 and an inner-circumferential surface of the through holes 12. As illustrated in FIG. 9, the center line of a scooping path 21 is curved in an arc shape when viewed from the axial direction, and extends from the center line of the load path 8 to the reference imaginary flat plane α. More specifically, the center line of the scooping path 21 is an arc having a radius of curvature R1 and is curved in a direction toward the outside in the radial direction as approaching the reference imaginary flat plane α in the circumferential direction.

Especially in this example, the tangent line T1 with respect to the center line of the load path 8 and the tangent line T2 with respect to the center line of the scooping path 21 are aligned with each other when viewed from the axial direction at the connecting point C1 between the center line of the load path 8 and the center line of the scooping path 21 so that the balls 4 may move smoothly from the load path 8 to the scooping path 21. Furthermore, in order to enable smoother movement of the balls 4 from the load path 8 to the scooping path 21, as illustrated in FIG. 10, the center line of the scooping path 21 is inclined by an angle corresponding to the lead angle of the shaft-side ball screw groove 6 with respect to the orthogonal imaginary flat plane β when viewed from the direction orthogonal to the reference imaginary flat plane α (side of the nut 3). However, in a case of implementing the present invention, the center lines of the scooping paths may be arranged so as to be parallel to the orthogonal imaginary flat plane β.

Further, the tangent line with respect to the center line of a scooping path 21 is arranged on the reference imaginary flat plane α at the connecting point C2 between the center line of the scooping path 21 and the center line of the connecting path 22 (straight path 22a as will be described later) so that the balls 4 may smoothly move between the scooping paths 21 and the connecting paths 22.

Figure 11:
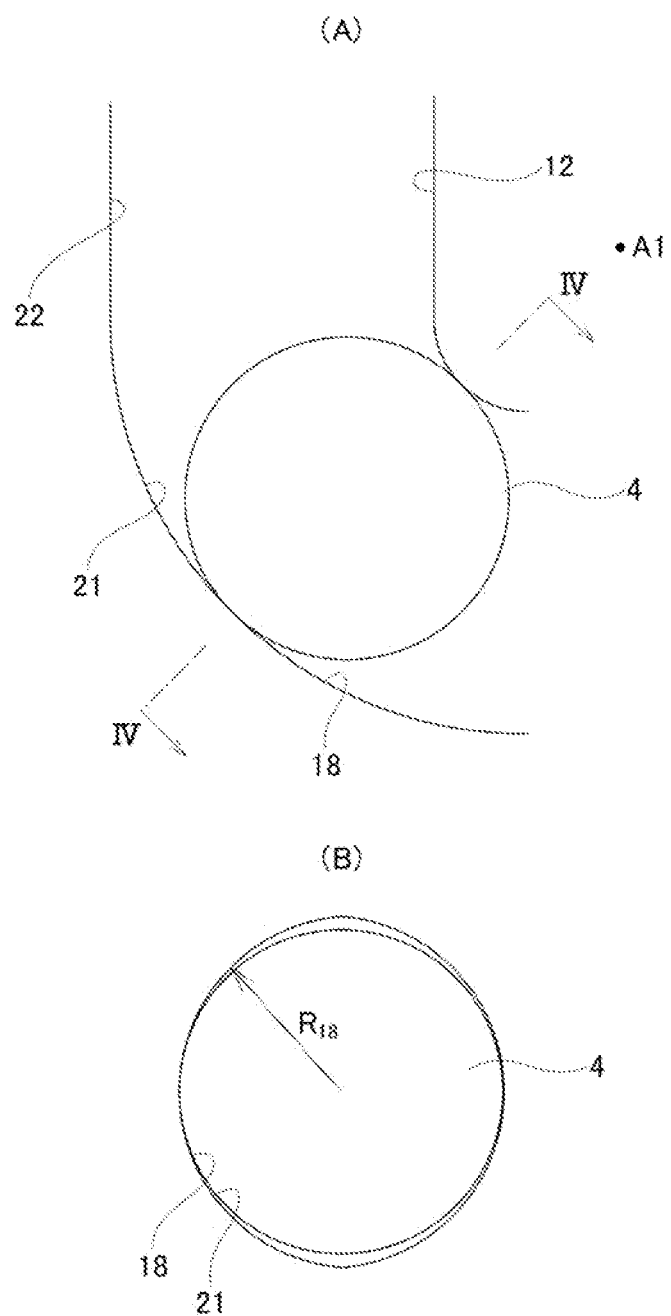
FIG. 11(A) is a schematic cross-sectional view illustrating a scooping path and a connecting path of the ball screw device as viewed from the axial direction.
FIG. 11(B) is a schematic cross-sectional view illustrating section IV-IV in FIG. 11(A).

Furthermore, as illustrated in FIG. 11, the radius of curvature $R_{18}$ of the cross-sectional shape of the leg-portion-side concave groove 18, which is an outer diameter side portion located on the side far from the center of curvature $A_1$ of the scooping path 21 of the inner wall surface of the scooping path 21, is made larger than half of the diameter D of the balls 4 ($R_{18} > D/2$) so that the balls 4 may smoothly move inside the scooping paths 21. As a result, the balls 4 are brought into contact with only one point on the inner wall surfaces of the scooping paths 21 where the balls 4 are strongly pressed by the centrifugal force.

Additionally, in order to increase the number of balls 4 that may be accommodated in the load path 8 and to increase the load capacity of the ball screw device 1, the scooping angle θ of the balls 4 by the scooping portion 17 (scooping path 21) is set to be large. More specifically, the scooping angle θ may be set in a range of 45° to 79° when the diameter of the balls 4 is 2.381 mm, and 45° to 80° when the diameter of the balls 4 is 2 mm. Here, the scooping angle θ is an angle from the reference line Z orthogonal to the reference imaginary flat plane α and the center axis $O_2$ of the screw shaft 2 to the connecting point C1.

Figure 19:
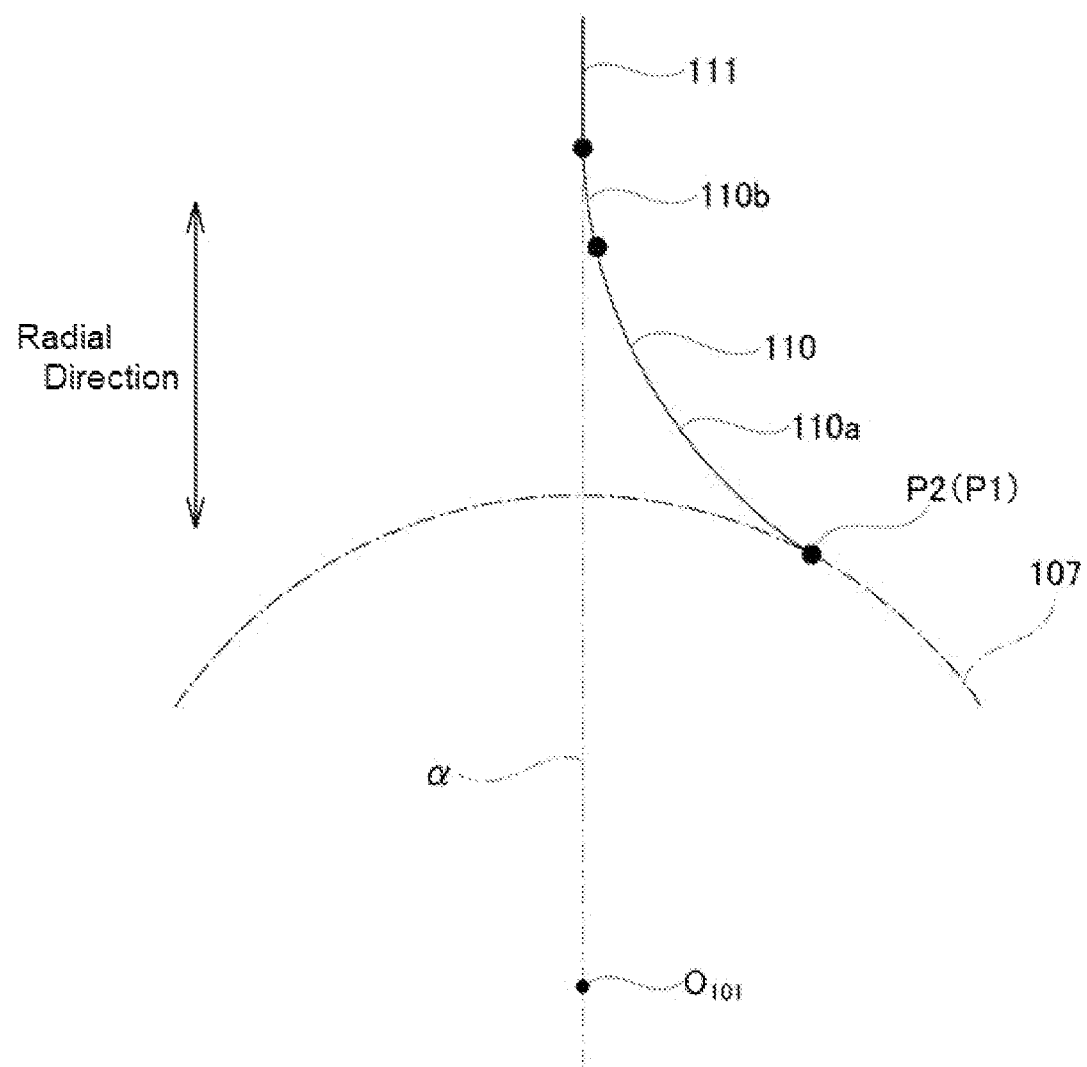
FIG. 19 schematically represents part of a center line of the circulation path of the ball screw device of a conventional structure as viewed from the axial direction.
Figure 20:
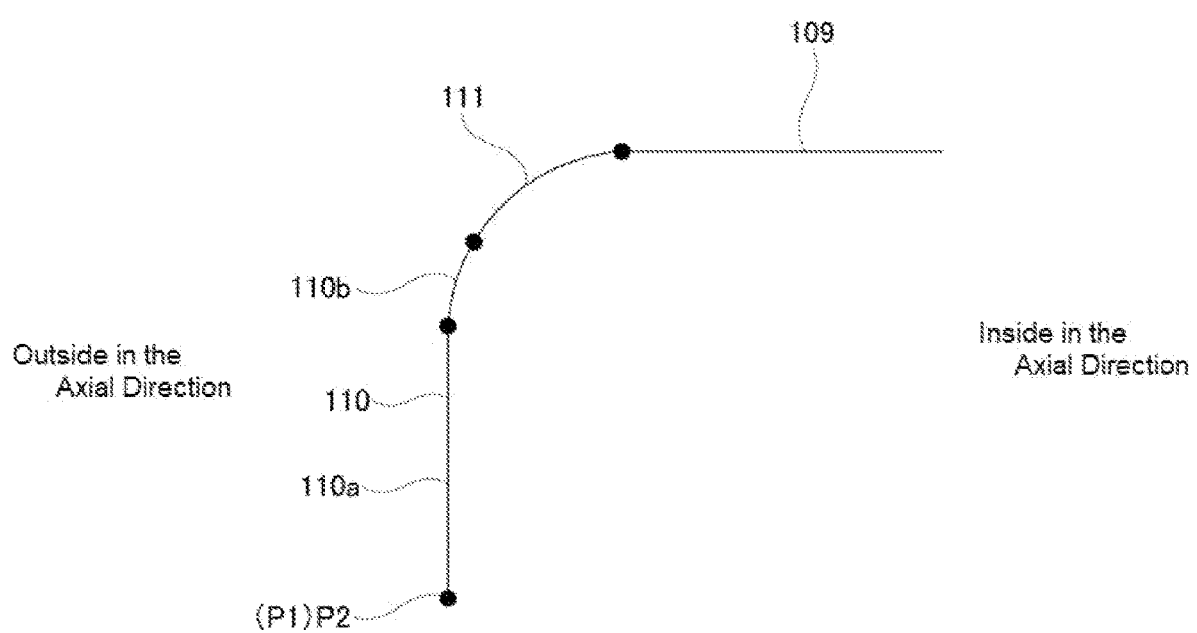
FIG. 20 schematically represents part of the center line of the circulation path of the ball screw device of a conventional structure as viewed from the nut side.
Figure 21:
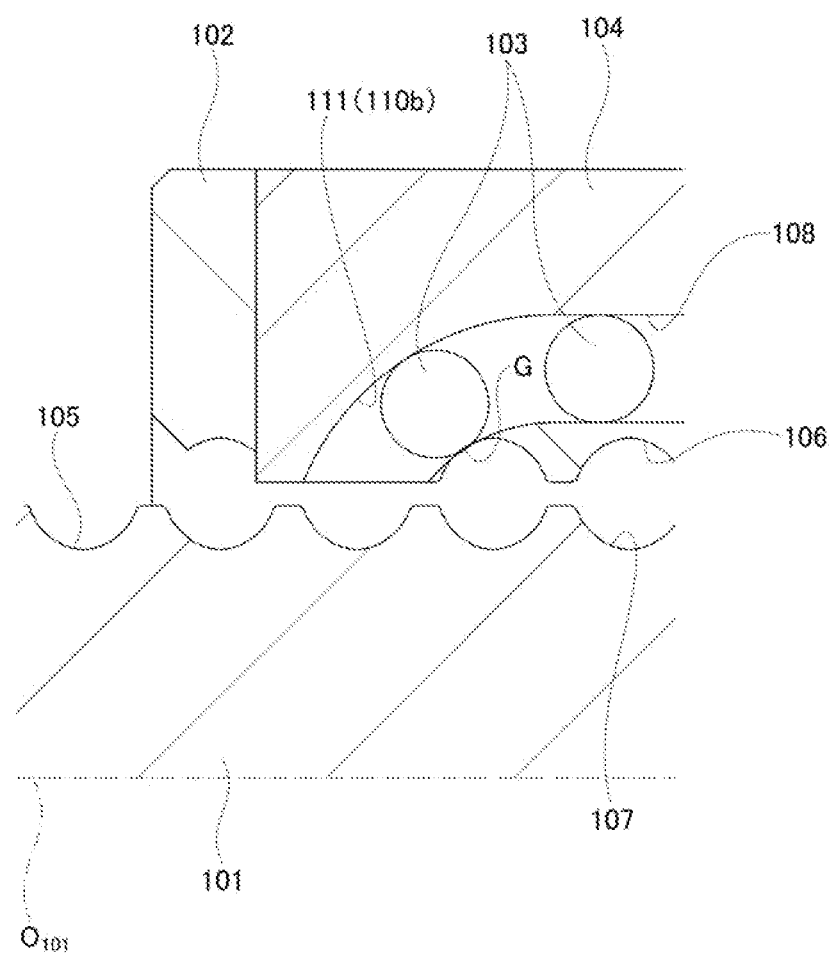
FIG. 21 is a partial cross-sectional view of a ball screw device illustrated in order to explain problems of a conventional structure.

The balls 4 move inside the scooping paths 21 so as to curve in an arc shape toward the outside in the radial direction while approaching the reference imaginary flat plane α in the circumferential direction. The balls 4 move in the direction X (radiation direction) by R1 cos(90°−θ) (=R1 sin θ) while moving on the scooping paths 21. In the ball screw device 1 of this example, unlike the conventional structure described in WO2010/013706 (see 110*b* in FIGS. 19 and 20), the balls 4 do not move toward the inside in the axial direction while moving on the scooping paths 21.

[Connecting Paths]

The connecting paths 22 have a role of connecting the scooping paths 21 and the return path 20. Each of the connecting paths 22 is composed of a leg-portion-side concave groove 18, an inner-circumferential surface of a through hole 12, and an end portion in the axial direction of the main-body-side concave groove 16 and an end portion in the axial direction of the nut-side concave groove 11. Each of the connecting paths 22 includes a straight path 22*a* arranged on the inside portion in the radial direction and an arc path 22*b* arranged on the outside portion in the radial direction.

[Straight Path]

Each of the straight paths 22*a* is composed of a leg-portion-side concave groove 18 and an inner-circumferential surface of a through hole 12. The straight path 22*a* is arranged on the reference imaginary flat plane α and have a linear center line extending in the direction (direction X) orthogonal to the center axis $O_2$ of the screw shaft 2. As a result, the balls 4 that move on the straight path 22*a* do not move in the axial direction and move only in the direction X. In this example, since the entire length of the straight path 22*a* (dimension in the radial direction) is S, the balls 4 move in the direction X by the amount of S while moving on the straight path 22*a*.

[Arc Paths]

Each of the arc paths 22*b* is composed of an end portion in the axial direction of the main-body-side concave groove 16 and an end portion in the axial direction of the nut-side concave groove 11. The center line of the arc path 22*b* is curved in an arc shape when viewed from the direction orthogonal to the reference imaginary flat plane α (side of the nut 3). More specifically, the center line of the arc path 22*b* is an arc having a radius of curvature R2 and arranged on the reference imaginary flat plane α, and is curved inward in the axial direction as going toward outside in the radial direction (direction approaching the return path 20).

In this example, the tangent line with respect to the center line of the arc path 22*b* at the connecting point C3 between the center line of the straight path 22*a* and the center line of the arc path 22*b* is aligned with the center line of the straight path 22*a* so that the balls 4 may smoothly move between the straight path 22*a* and the arc path 22*b*.

Further, the tangent line with respect to the center line of the arc path 22*b* at the connecting point C4 between the center line of the arc path 22*b* and the center line of the return path 20 is aligned with the center line of the return path 20 so that the balls 4 may smoothly move between the arc path 22*b* and the return path 20.

Figure 12:
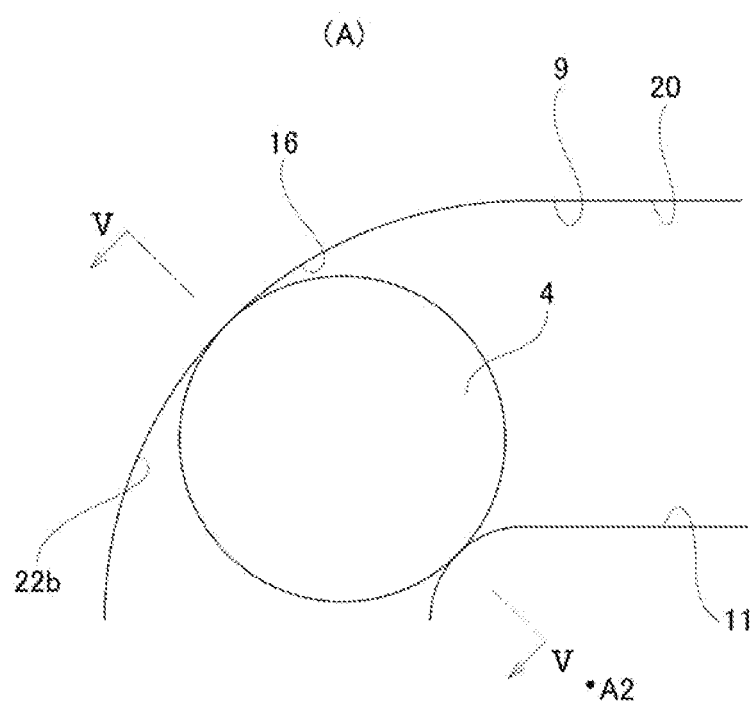
FIG. 12(A) is a schematic cross-sectional view illustrating a connecting path and a return path of the ball screw device as viewed from the nut side.
FIG. 12(B) is a schematic cross-sectional view illustrating section V-V of FIG. 12(A).
Figure 12:
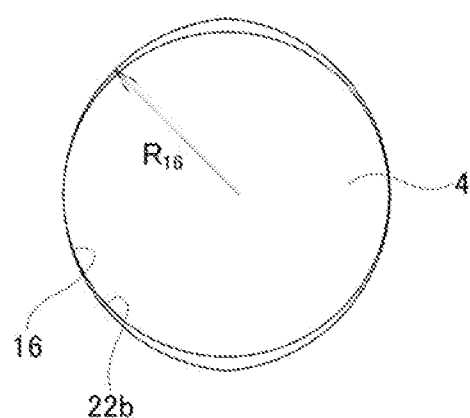
Figure 13:
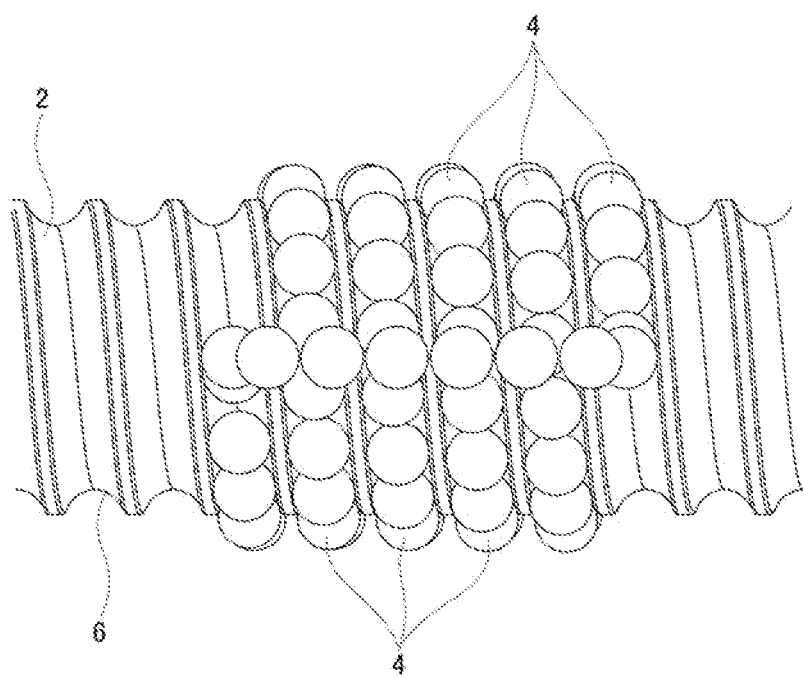
FIG. 13 is a plan view illustrating only the screw shaft and the balls of the ball screw device with the nut and circulation component omitted.
Figure 14:
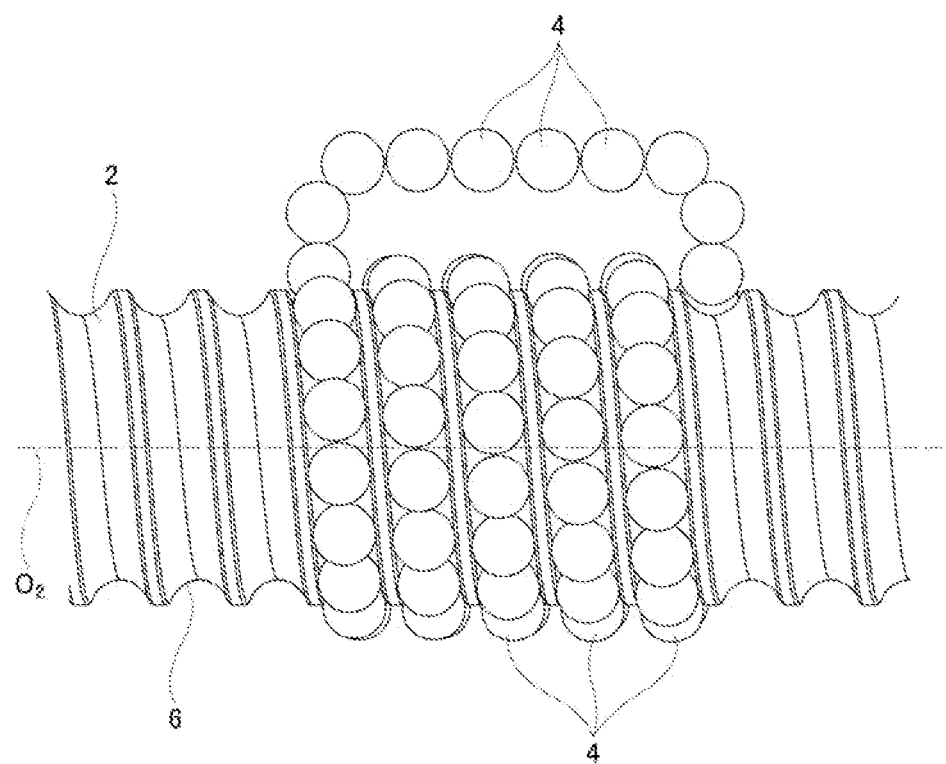
FIG. 14 is a side view illustrating only the screw shaft and the balls of the ball screw device with the nut and circulation component omitted.
Figure 15:
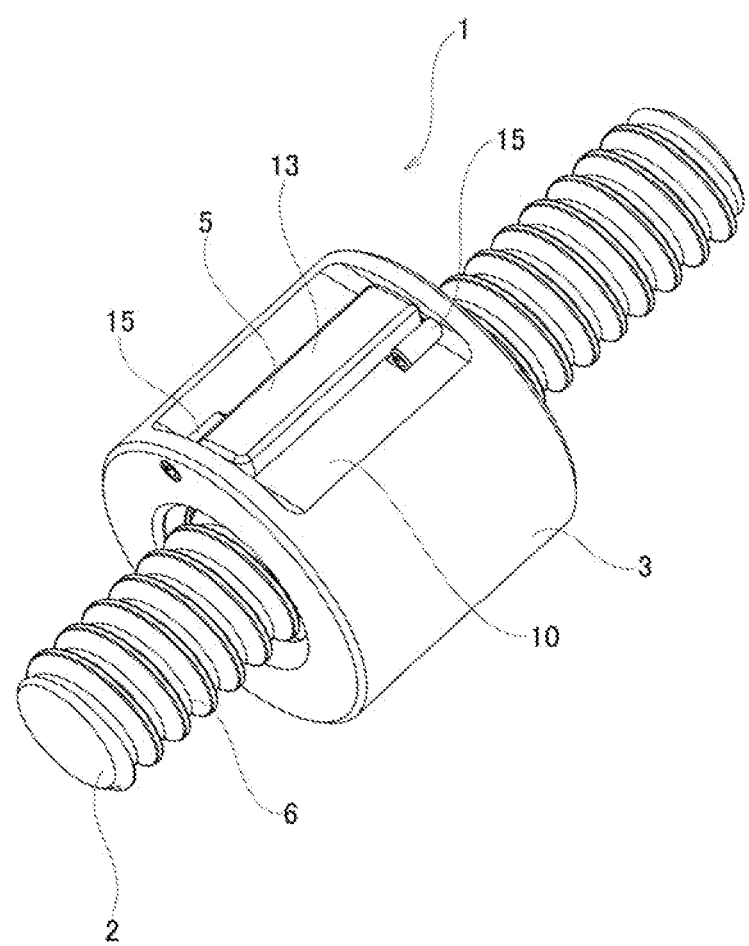
FIG. 15 is a view corresponding to FIG. 1, illustrating a modification of the ball screw device using a circulation component which is integrally configured as a whole.
Figure 16:
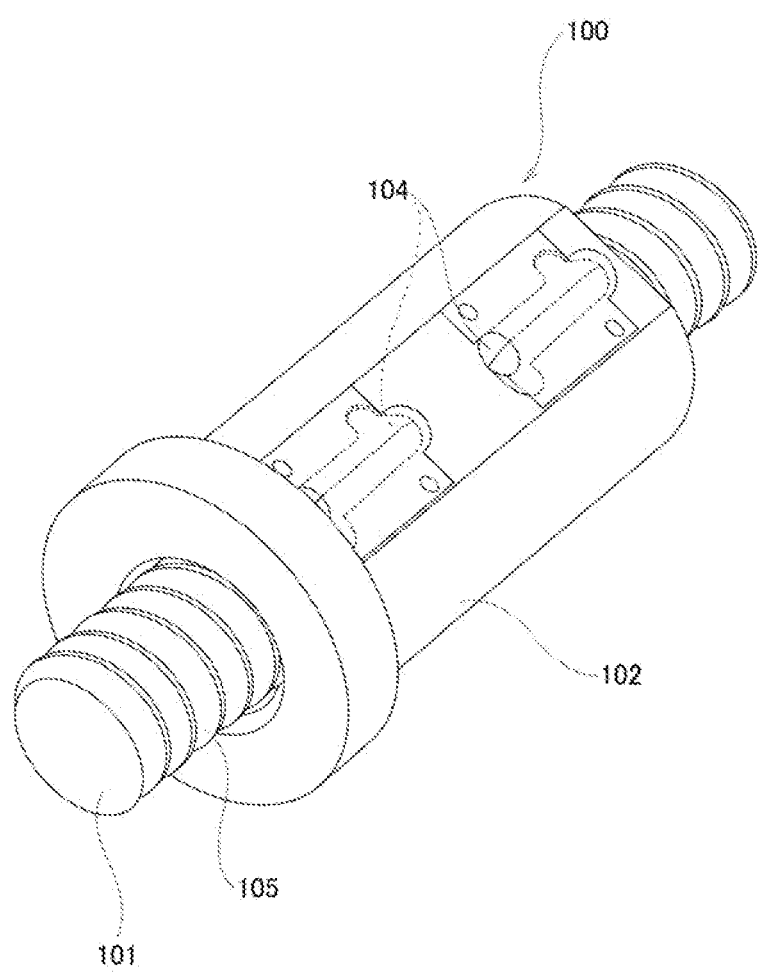
FIG. 16 is a perspective view of a ball screw device of a conventional structure.
Figure 17:
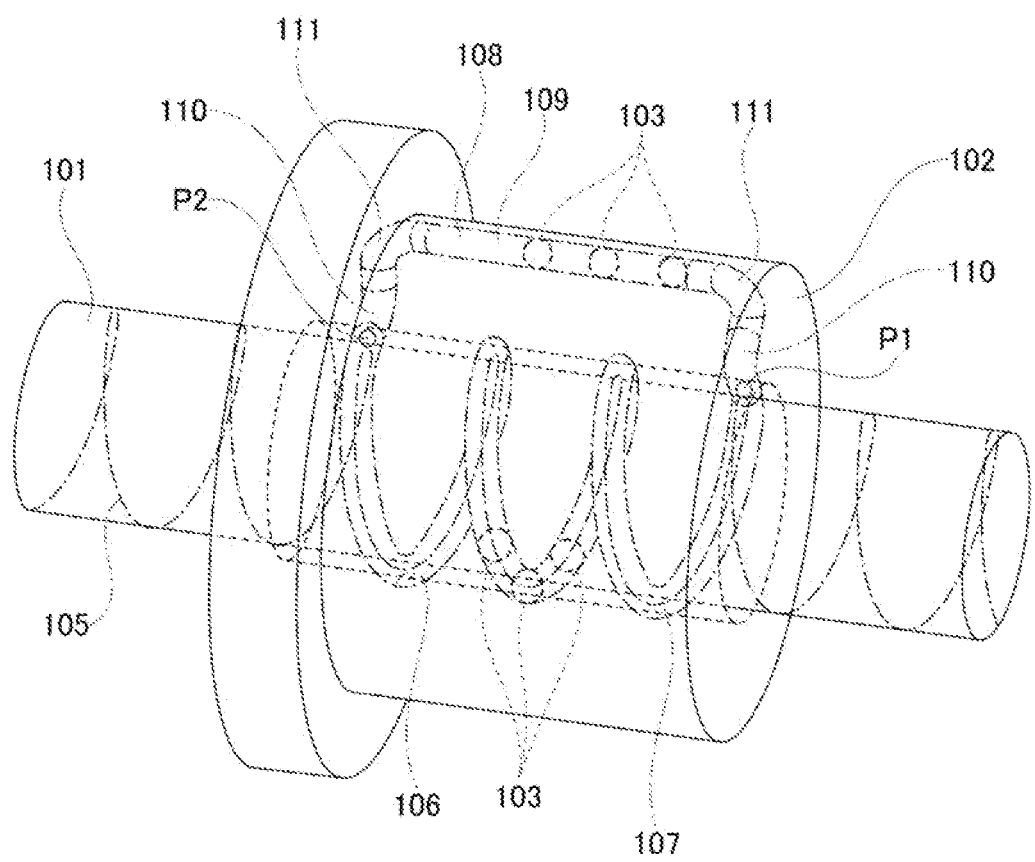
FIG. 17 is a transparent perspective view of the ball screw device of a conventional structure.
Figure 18:
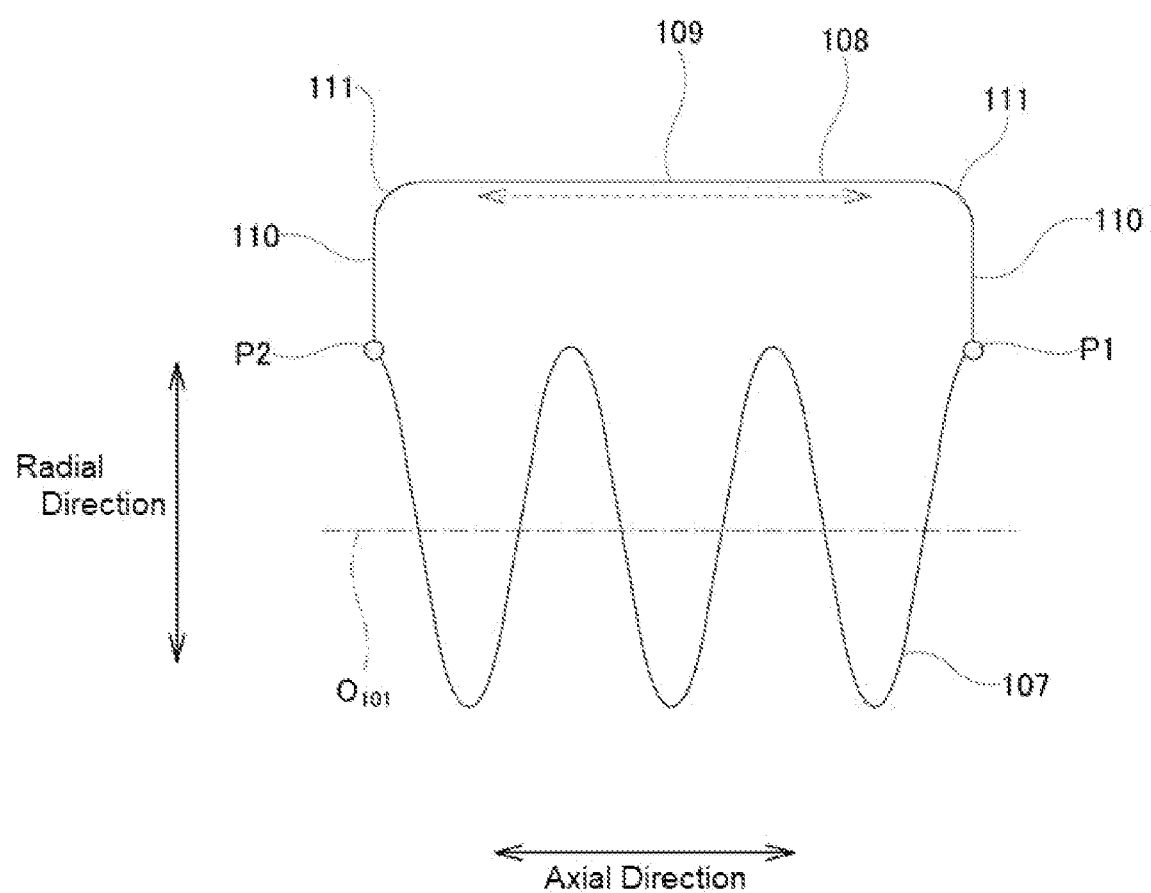
FIG. 18 schematically represents the center line of the load path and the circulation path of the ball screw device of a conventional structure.

Furthermore, as illustrated in FIG. 12, the radius of curvature $R_{16}$ of the cross-sectional shape of an end portion in the axial direction of the main-body-side concave groove 16, which is an outer diameter side portion located on the side far from the center of curvature $A_2$ of the arc path 22*b* of the inner wall surface of the arc path 22*b*, is made larger than half of the diameter D of the balls 4 ($R_{16}$>D/2) so that the balls 4 may smoothly move inside the arc path 22*b*. As a result, the balls 4 are brought into contact with only one point on the inner wall surfaces of the arc path 22*b* where the balls 4 are strongly pressed by the centrifugal force.

The balls 4 scooped up from the load path 8 move inside the circulation path 9 in the order of the scooping path 21, the straight path 22*a* and the arc path 22*b* of the connecting path 22, the return path 20, the arc path 22*b* and the straight path 22*a* of the connecting path 22, and the scooping path 21, and return to the load path 8 again. In the circulation path 9 of this example as described above, only the arc paths 22*b* are curved toward inside in the axial direction so as to approach the load path 8 when viewed from the direction orthogonal to the reference imaginary flat plane α. As a result, only the arc paths 22*b* may interfere with the load path 8.

In this example, in order to prevent the arc paths 22*b* from interfering with the load path 8, the installation height of the arc paths 22*b* (height from the connecting points C1 and positions in the radial direction) is regulated. More specifically, the value of R1 cos(90°−θ)+S, which is the sum of the dimension in the direction X of the scooping path 21 and the dimension in the direction X of the straight path 22*a*, which corresponds to the installation height of the arc path 22*b*, is set larger than the diameter D of the balls 4 (R1 cos(90°−θ)+S>D). Furthermore, since the dimension in the direction X of the scooping path 21 may be approximated to the radius of curvature R1, the value of R1+S, which is the sum of the radius of curvature R1 of the scooping path 21 and the dimension in the direction X of the straight path 22*a*, may also be set larger than the diameter D of the balls 4 (R1+S>D).

The ball screw device 1 of this example as described above may have a route of the circulation path 9 suitable for automotive applications.

In this example, in order to apply the ball screw device 1 to automotive applications, the number of the threads of the shaft-side ball screw groove 6 and the nut-side ball screw groove 7 is set to one, and the ratio (D/L) of the lead L of the shaft-side ball screw groove 6 and the nut-side ball screw groove 7 with respect to the diameter D of the balls 4 is set to 0.6 or more, therefore, the pitch (groove spacing) of the nut-side ball screw groove 7 becomes small. As a result, when the arc paths 22*b* are arranged at positions where the height from the scooping point (height in the direction X from C1) is not sufficient, as in the case of the conventional structure described above, the arc paths 22*b* easily interfere with the load path 8.

In view of the above, in this example, the straight paths 22*a* are provided inside in the radial direction of the arc paths 22*b* so that the balls 4 are moved only in the direction X (radial direction, radiation direction) without moving toward inside in the axial direction, and the value of R1 cos(90°−θ)+S, which is the sum of the dimension in the direction X of the scooping path 21 and the dimension in the direction X of the straight path 22*a*, is set to be larger than the diameter D of the balls 4. As a result, the installation height of the arc paths 22*b* may be sufficiently secured, and the arc paths 22*b* may be effectively prevented from interfering with the load path 8. More specifically, an end portion in the axial direction of the nut-side concave groove 11 of the arc path 22*b* is prevented from crossing the groove portion in the second row from the outside in the axial direction of the nut-side ball screw groove 7 (G1 portion in FIG. 4). Furthermore, the thickness between the end portions in the axial direction of the nut-side concave groove 11 and the groove portions of the nut-side ball screw groove 7 may be sufficiently secured. As a result, it can be prevented the load capacity from decreasing due to lowering of the rigidity of the nut 3.

At the connecting point C1 between the center line of the load path 8 and the center line of the scooping path 21, the tangent line T1 with respect to the center line of the load path 8 and the tangent line T2 with respect to the center line of the scooping path 21 are aligned with each other when viewed from the axial direction. As a result, the balls 4 may be smoothly moved from the load path 8 to the scooping path 21. Furthermore, since the center line of the scooping path 21 is inclined by an angle corresponding to the lead angle of the shaft-side ball screw groove 6 with respect to the orthogonal imaginary flat plane β when viewed from the direction orthogonal to the reference imaginary flat plane α, the balls 4 may be smoothly moved from the load path 8 to the scooping path 21 as well from this point of view.

Since the tangent line with respect to the center line of the scooping path 21 at the connecting point C2 between the center line of the scooping path 21 and the center line of the straight path 22a is arranged on the imaginary flat plane α, the balls 4 may be smoothly moved from the scooping path 21 to the straight path 22a.

Since the tangent line with respect to the center line of the arc path 22b at the connecting point C3 between the center line of the straight path 22a and the center line of the arc path 22b is aligned with the center line of the straight path 22a, the balls 4 may be smoothly moved between the straight path 22a and the arc path 22b.

Since the tangent line with respect to the center line of the arc path 22b at the connecting point C4 between the center line of the arc path 22b and the center line of the return path 20 is aligned with the center line of the return path 20, the balls 4 may be smoothly moved between the arc path 22b and the return path 20.

Further, the radius of curvature $R_{18}$ of the cross-sectional shape of the leg-portion-side concave groove 18, which is an outer diameter side portion located on the side far from the center of curvature $A_1$ of the scooping path 21 of the inner wall surface of the scooping path 21, is made larger than half of the diameter D of the balls 4 ($R_{18}$>D/2). Furthermore, the radius of curvature $R_{16}$ of the cross-sectional shape of an end portion in the axial direction of the main-body-side concave groove 16, which is an outer diameter side portion located on the side far from the center of curvature $A_2$ of the arc path 22b of the inner wall surface of the arc path 22b, is made larger than half of the diameter D of the balls 4 ($R_{16}$>D/2). As a result, since the balls 4 may be tangentially contacted with the inner wall surfaces of the scooping paths 21 and the arc paths 22b, the balls 4 may be smoothly moved.

In a case of implementing the present invention, the circulation path of the ball screw device may be alternatively composed of only a circulation component. Further, it is also assumed that the circulation component is omitted, or the circulation component and the nut are integrally formed so as to form a circulation path inside the nut. Even when the circulation path is composed of the circulation component and the nut, the shape of each concave groove (inner wall surface) of the circulation path is not limited to the shape as described above. Furthermore, as for the shapes and fixing methods of each portion of the circulation component as well, various conventionally known shapes and methods may be adopted.

REFERENCE SIGNS LIST

1 Ball screw device
2 Screw shaft
3 Nut
4 Balls
5 Circulation component
6 Shaft-side ball screw groove
7 Nut-side ball screw groove
8 Load path
9 Circulation path
10 Seating surface portion
11 Nut-side concave groove
12 Through holes
13 Main body portion
14 Leg portions
15 Holding member
16 Main-body-side concave groove
17 Scooping portion
18 Leg-portion-side concave groove
19a, 19b Pieces
20 Return path
21 Scooping path
22 Connecting path
22a Straight path
22b Arc path
100 Ball screw device
101 Screw shaft
102 Nut
103 Balls
104 Circulation component
105 Shaft-side ball screw groove
106 Nut-side ball screw groove
107 Load path
108 Circulation path
109 Return path
110 Scooping path
110a Inner-diameter-side scooping path
110b Outer-diameter-side scooping path
111 Connecting path

The invention claimed is:

1. A ball screw device comprising:
a screw shaft having a spiral shaft-side ball screw groove with a number of threads of one on an outer-circumferential surface thereof;
a nut having a spiral nut-side ball screw groove with a number of threads of one on an inner-circumferential surface thereof;
a spiral load path composed of the shaft-side ball screw groove and the nut-side ball screw groove;
a circulation path connecting a start point and an end point of the load path; and
a plurality of balls rolling on the load path and the circulation path;
wherein the circulation path has:
a return path arranged on an outside in a radial direction of the load path and having a center line parallel to a center axis of the screw shaft;
scooping paths respectively arranged on both sides in a length direction of the return path and scooping up the balls from the load path; and
connecting paths respectively arranged on the both sides in the length direction of the return path and connecting the return path and the scooping paths; wherein each of the scooping paths has an arc-shaped center line which is curved toward outside in the radial direction as approaching a reference imaginary flat plane including the center axis of the screw shaft and the center line of the return path in a circumferential direction and extends from a center line of the load path to the reference imaginary flat plane;

each of the connecting paths has a straight path having a linear center line that is arranged on the reference imaginary flat plane and extends in a direction orthogonal to the center axis of the screw shaft, and an arc path having an arc-shaped center line that is arranged on the reference imaginary flat plane and is curved inward in an axial direction as going toward outside in the radial direction; and when a lead of the shaft-side ball screw groove and the nut-side ball screw groove is L, a diameter of the balls is D, a radius of curvature of the center line of each of the scooping paths is R1, a scooping angle of the balls by each of the scooping paths is θ, and an entire length of the straight path is S, $D/L \geq 0.6$ is satisfied and $R1 \cos(90°-θ)+S>D$ is satisfied.

2. The ball screw device according to claim 1, wherein a radius of curvature of a cross-sectional shape of an outer diameter side portion located on a side far from a center of curvature of each of the scooping paths of an inner wall surface of each of the scooping paths, and a radius of curvature of a cross-sectional shape of an outer diameter side portion located on a side far from a center of curvature of the arc path of an inner wall surface of the arc path are both larger than half of the diameter of the balls.

3. The ball screw device according to claim 1, wherein a tangent line with respect to the center line of the load path and a tangent line with respect to the center line of each of the scooping paths are aligned with each other when viewed from the axial direction at a connecting point between the center line of the load path and the center line of each of the scooping paths.

4. The ball screw device according to claim 1, wherein a tangent line with respect to the center line of each of the scooping paths at a connecting point between the center line of each of the scooping paths and the center line of the straight path is arranged on the reference imaginary flat plane.

5. The ball screw device according to claim 1, wherein the center line of each of the scooping paths is inclined by an angle corresponding to a lead angle of the shaft-side ball screw groove when viewed from a direction orthogonal to the reference imaginary flat plane.

6. The ball screw device according to claim 1, wherein a circulation component having part or all of the circulation path inside thereof is provided.

7. The ball screw device according to claim 6, wherein the circulation path is formed by the circulation component and the nut.

* * * * *